Oct. 3, 1950     S. H. GORMAN     2,524,659
PORTABLE AUTOMOBILE SEAT ARMREST
Filed Dec. 2, 1948
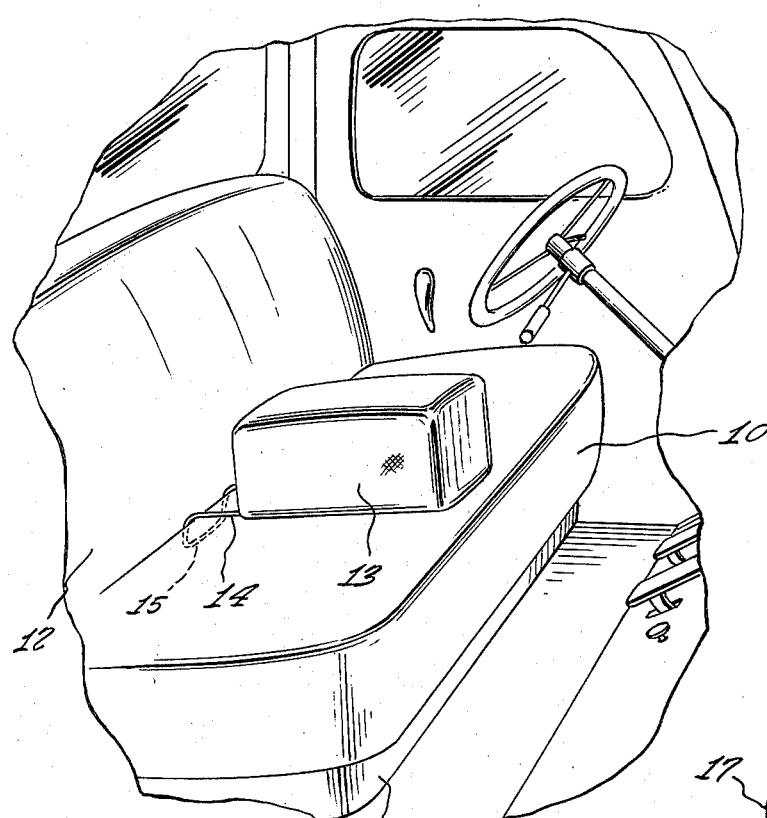
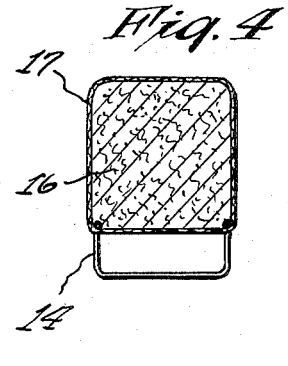
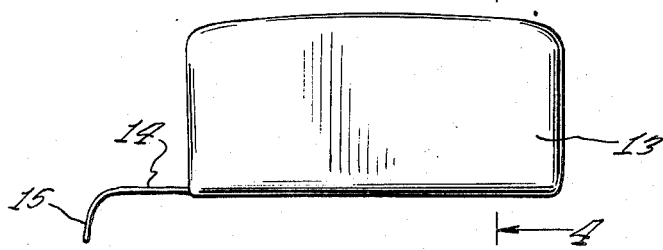
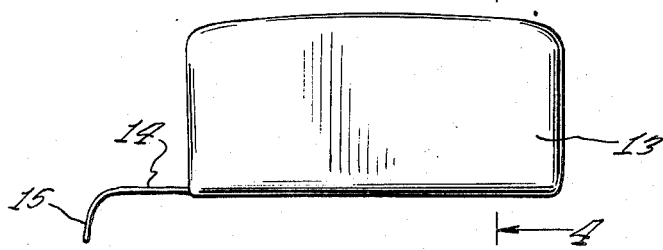
INVENTOR.
SAMUEL H. GORMAN
BY
Carl Miller
ATTORNEY Patented Oct. 3, 1950

2,524,659

UNITED STATES PATENT OFFICE 2,524,659

PORTABLE AUTOMOBILE SEAT ARMREST

Samuel H. Gorman, Brooklyn, N. Y.

Application December 2, 1948, Serial No. 63,050

1 Claim. (Cl. 155—112)

This invention relates to a portable automobile seat arm rest.

It is an object of the present invention to provide an arm rest which can be readily and quickly installed on the seat of an automobile to provide an arm rest and to make the riding in the automobile more comfortable for the riders and wherein the arm rest can be fitted without disconnecting any of the portions of the seat and merely requires the extension of a curved wire projection into the crack between the seat bottom and the back of the seat.

Other objects of the present invention are to provide an automobile seat arm rest which is of simple construction, inexpensive to manufacture, durable and compact, where the attaching projection serves as a handle for carrying the rest, easy to install and efficient in operation.

For other objects and for a better understanding of the invention, reference may be had to the following detailed description taken in connection with the accompanying drawing, in which Fig. 1 is a fragmentary perspective view of the interior of an automobile with the arm rest of the present invention installed upon the seat thereof.

Fig. 2 is a side elevational view of the arm rest.

Fig. 3 is a top plan view of the arm rest.

Fig. 4 is a transverse sectional view of the arm rest taken on line 4—4 of Fig. 2.

Referring now to the figures, 10 represents the bottom of an automobile seat which is usually removable from a bottom support 11. In rear of this seat is a seat back 12. According to the present invention, there is provided a portable arm rest 13 which has a wire projection 14 formed of U-shape and extending rearwardly and downwardly to provide a portion 15 which will be extended downwardly into a crack between the bottom seat and the back rest 12. The portion 15 is of U-shape and is rounded so as not to destroy the seat covering.

The arm rest is formed with a large block of material, as indicated at 16. This material may be wood, plastic, hard rubber, foam rubber, or it can be upholstered with hair and springs. The material can be covered with a leather, plastic or cloth covering 17 to provide a clean surface and also to hold the portions together. The projection 14 extends through the full length of the material, as indicated by dotted lines 18 in Fig. 3. The material may be secured by vulcanizing or cementing the same to the wire.

It will be seen that the arm rest extends from the front of the seat to the rear, is portable, can be readily put in place or removed. It can be removed very easily if it is desired to have more than two people occupy the seat.

While various changes may be made in the detail construction, it shall be understood that such changes shall be within the spirit and scope of the present invention as defined by the appended claim.

Having thus set forth and disclosed the nature of my invention, what is claimed is:

A portable automobile seat arm rest comprising a block of material, a wire attaching portion secured to the block of material along its bottom face and bent so as to extend between the seat bottom and the back of the seat upon the bottom of the block being rested upon the seat, and said block being laterally slidable and entirely removable therefrom, said block being formed of soft cushioning material, and a covering surrounding the block and the wire except for the portion of the wire which extends beyond the block material and fits between the rear of the seat and the seat back, thereby reenforcing the base of the block.

SAMUEL H. GORMAN.

REFERENCES CITED

The following references are of record in the file of this patent:

UNITED STATES PATENTS

| Number | Name | Date |
|---|---|---|
| 169,138 | Borgfeldt | Oct. 20, 1875 |
| 1,303,043 | DeLong | May 6, 1919 |
| 2,128,435 | Shippee et al. | Aug. 30, 1938 |
| 2,322,403 | Van Der Kieft | June 22, 1943 |